(12) United States Patent
Rohde et al.

(10) Patent No.: US 9,073,174 B2
(45) Date of Patent: Jul. 7, 2015

(54) ELECTRIC HANDHELD TOOL HAVING AN ADJUSTABLE SAFETY GUARD

(75) Inventors: Alexander Rohde, Oberboihingen (DE); Michael Keller, Nuertingen (DE)

(73) Assignee: METABOWERKE GMBH, Nuertingen (DE)

( * ) Notice: Subject to any disclaimer, the term of this patent is extended or adjusted under 35 U.S.C. 154(b) by 623 days.

(21) Appl. No.: 13/500,142

(22) PCT Filed: Oct. 6, 2010

(86) PCT No.: PCT/EP2010/064907
§ 371 (c)(1),
(2), (4) Date: May 7, 2012

(87) PCT Pub. No.: WO2011/042460
PCT Pub. Date: Apr. 14, 2011

(65) Prior Publication Data
US 2012/0270480 A1  Oct. 25, 2012

(30) Foreign Application Priority Data

Oct. 6, 2009  (DE) .......................... 10 2009 048 357

(51) Int. Cl.
*B24B 55/04* (2006.01)
*B24B 55/05* (2006.01)
*B23D 45/16* (2006.01)
*B24B 23/02* (2006.01)
*B25F 5/02* (2006.01)

(52) U.S. Cl.
CPC .............. *B24B 55/052* (2013.01); *B23D 45/16* (2013.01); *B24B 23/02* (2013.01); *B25F 5/02* (2013.01)

(58) Field of Classification Search
USPC .................................. 451/358, 359, 451, 452
See application file for complete search history.

(56) References Cited

U.S. PATENT DOCUMENTS

| 6,949,017 B2 * | 9/2005 | Koschel et al. ............... 451/358 |
| 7,892,075 B2 * | 2/2011 | Esenwein ..................... 451/451 |
| 8,454,411 B2 * | 6/2013 | Boeck et al. .................. 451/344 |
| 2008/0153404 A1 | 6/2008 | Schmidberger-Brinek |
| 2008/0280549 A1 | 11/2008 | Sulea et al. |

FOREIGN PATENT DOCUMENTS

| DE | 3633943 A1 | 4/1988 |
| DE | 41 13 641 A1 | 10/1992 |
| DE | 19841409 C1 | 2/2000 |
| DE | 103 36 873 A1 | 3/2005 |
| DE | 10 2007 041 840 A1 | 5/2008 |
| WO | WO2011/042460 A1 | 4/2011 |

* cited by examiner

*Primary Examiner* — Lee D Wilson
*Assistant Examiner* — Shantese McDonald
(74) *Attorney, Agent, or Firm* — Paine Hamblen, LLP

(57) ABSTRACT

An electric handheld tool having a safety guard which is rotatably adjustably mounted thereto, and which further has a resilient latching means; a counter latching means borne by the electric handheld tool, and which cooperates with the latching means; and a stop means moveable between first and second portions and which cooperates with the latching means such that latching means, and counter latching means are either, on the one hand, held in engagement, or are released from engagement so as to permit selective movement of the safety guard.

20 Claims, 7 Drawing Sheets

ELECTRIC HANDHELD TOOL HAVING AN ADJUSTABLE SAFETY GUARD

RELATED PATENT DATA

The present patent application claims priority from German Patent Application Number 10 2009 048 357.8 and which was filed Oct. 6, 2009 and PCT Application Serial No. PCT/EP2010/064907, and which was filed on Oct. 6, 2010.

The present invention relates to an electric handheld tool having a safety guard that can be releasably fastened to a spindle neck of an electric handheld tool, and that is rotatable, at least to a limited extent, about an axis which is parallel to the spindle axis or which is in alignment with the same, and that, by means of a resiliently biased latching means mounted on the safety guard, and when located in various rotary positions acts together with a counter-latching means on the spindle neck so as to inhibit rotation; and the latching means, when in the rotary position, can be in engagement with the counter-latching means. In the described embodiments, the safety guard can be pushed onto the spindle neck for the purpose of mounting and then brought into a rear grip position, and wherein the latching means can be resiliently displaced on the safety guard in the axial direction of the spindle axis, and the counter-latching means are provided in the circumferential direction on the axial end face of the spindle neck.

When the latching means and counter-latching means are in engagement, the two assemblies act together in a latching manner, such that the safety guard is arrested in a given rotary position.

Previous safety guards are known, for example, from DE 36 33 943 C2. The safety guard described in this document comprises a collar-shaped portion, by which the safety guard can be pushed onto the spindle neck of the electric handheld tool and then rotated into a rear grip position.

Provided on the collar-shaped portion of the previously described safety guard is a spring element, which is bent into an S-like shape, and which is biased in the radial direction and which further engages or otherwise cooperates with the circumferential toothing of the spindle neck so as to inhibit rotation of the safety guard. The safety guard, by overcoming the inhibition of rotation as provided by the spring element, can be turned from one latching position to the next.

In the case of this previously described safety guard mount, this arrangement has proved to be disadvantageous because the comparatively fragile S-shaped spring element can be easily damaged or bent out of shape when the safety guard is being released and removed from the spindle neck. To enable the safety guard alone to be turned against the force of the rotation-inhibiting spring, the means that effect the rear grip position, that is, a circumferential groove, is formed in a manner whereby the safety guard is mounted and has some play, or ability to move in the axial direction. This arrangement results in irritating rattling noises being generated by the safety guard when the electric handheld tool is put into operation.

An electric handheld tool of the generic type is also known and disclosed in DE 198 41 409 C1.

According to most recent commercial safety requirements, safety guards for parting-off grinders and angle grinders must pass a safety-guard test according to DIN EN 60745-2-3, and in which, following the destruction of the grinding or parting-off disk, the safety guard rotatably turns only by a given amount in relation to a defined initial position.

The present invention as discussed herein is based on the object of improving the safety of electric handheld tools to that extent.

This objective is achieved by an electric handheld tool having the features of claim 1.

It is thereby achieved, according to the invention, that, on the one hand, the safety guard, as will be described hereinafter, is latched in a respective rotary position so as to inhibit rotation and, on the other hand, the safety guard is always biased in the axial direction in such a manner that it is mounted tightly, and without play or substantial movement on the spindle neck.

As a result, the operational attributes of the tool are greatly improved and no irritating, rattling sounds are produced while the electric handheld tool is being operated.

The present invention provides a stop means, which, in a first position, acts together with the latching means and limits the axially resilient displacement of the latching means in such a way that the latching means, and the counter-latching means are held in engagement. Further, in a second position, the stop means releases the axial displacement to such an extent that the latching means and counter-latching means can be brought out of engagement and turned relative to each other. This feature results in the fulfillment of the requirements in DIN EN 60745-2-3, which provides that, in the case of the grinding or parting-off disk being destroyed, the safety guard may only be turned slightly in relation to the working position. Furthermore, in the present invention the stop means can be moved out of engagement, or into a second position, such that the latching means and the counter-latching means can disengage, and in particular can index over each other, and can then be turned relative to each other. In this arrangement, it is still possible to easily adjust the safety guard into the various rotary positions and, nevertheless, to provide a rigid stop means that cannot be overcome by the force of an operator.

In one form of the invention, the stop means is described as being attached to the safety guard itself.

In particular, in one form of the invention, the safety guards, have a collar-shaped portion that, includes a clamping band or which can be connected to a clamping band, and wherein the clamping band provides for further fixing to the spindle neck in that the clamping band, by clamping in the circumferential direction, enables the safety guard to bear against or forcibly engage the spindle neck in the region of the spindle neck and the collar. The stop means in this form of the invention can be fixed in place in the region of the collar-shaped portion or alternatively in the region of the safety guard collar and, in particular, the stop means can be connected to the clamping band.

In one form of the invention, the collar-shaped portion of the safety guard or of the clamping band has a corresponding recess, and the stop means extends through in the region of the recess. Alternatively, the stop means can be located inside the collar-shaped portion.

The resiliently displaceable latching means as described in further detail, below preferably extends substantially perpendicularly, and radially outwardly relative to the spindle axis. In a further form of the invention, the resiliently displaceable latching means takes on the form of a planar spring plate. This arrangement proves to be particularly advantageous, since, for the first time, the latching means can be employed to cover the spindle neck region towards the machining side, such that the region of the latching means and counter-latching means, but also the transition of the spindle to the tool housing, can be protected against exposure to dust and particles, and therefore against associated abrasive wear. To this extent, it proves to be quite particularly advantageous if the resiliently displaceable latching means as described above has an opening, through which the drive spindle or tool axis extends, since extensive covering of the aforementioned critical region can then be achieved.

The present invention provides a compact safety guard that is very easy to manipulate, and which further has a collar-shaped, flange-type portion, by which it can be pushed onto the spindle neck of the electric handheld tool. In the described arrangement, the resiliently displaceable latching means is disposed with a portion that is inside the collar-shaped portion and surrounds the drive spindle or tool axis. In this described arrangement, there is no risk of the resiliently displaceable latching means becoming bent during use on the construction site. This design feature also makes the safety guard easier to handle and store.

In the present invention, it proves to be particularly advantageous if the resiliently displaceable latching means is formed, and in particular riveted, soldered or welded, onto the inside surface of the safety guard that faces towards the tool or workpiece. Further, it is also possible to provide a safety guard, that can be clamped to the spindle neck by means of clip-type collar portions and that further has a resiliently biased latching means, which needs only to be fastened to the inside of the safety guard. In such an arrangement, the clip-type collar portions are connected to each other in such a way that the safety guard can be pushed onto the spindle neck.

In the present invention, radial, guide-type projections are provided on the safety guard and can then be pushed on over axially oriented, and, in particular groove-shaped, guide means formed on the spindle neck and then turned or rotated to a rear grip position. This takes the form of a groove system which extends in the circumferential direction about the spindle neck.

The safety-guard latching means that can be resiliently displaced in the axial direction then causes rotation of the safety guard to be inhibited in a respective latching position.

With regard to the latching means which takes on the form of a planar spring plate, one or more protuberances are provided, which act as a latching lug. These protuberances are provided on the side that faces towards the spindle neck, or the latching means could be bent, for example in a V shape, in this region. In any case, it proves to be advantageous if a latching lug is pressed out of the plane of the spring plate, and in the direction of the axial end face of the spindle neck, by making a punched cut, since in such a case the planar, preferably flat configuration of the spring plate can be maintained. The latching lug, which is preferably formed in the preceding manner, has flanks advantageously constituting run-on slopes which are disposed in the circumferential direction and also in the direction of rotation of the safety guard. Depending upon the inclination of the flanks and on the configuration of the counter-latching means, the safety guard can be made to be more difficult or less difficult to turn on the spindle neck.

Advantageously, the latching lugs as described, above have a rounded configuration, and are delimited radially inwardly by a punched freeform.

In one possible form of the invention, the stop means can be moved, in the radial or circumferential direction, from a first to a second position and vice versa. Particularly preferably, it can be provided that the stop means is connected to the safety guard by means of a compression spring or tension spring, and can be moved out of engagement with the latching means, against the biasing force of the spring, and in the circumferential direction upon being moved from the aforementioned first to the second position. Alternatively, in another form of the invention, a pivoted lever is provided, and which carries the stop means or acts together with the same, and wherein the pivoted lever can be provided with an axis parallel to the spindle axis, and about which the pivoted lever is articulated so as to be pivotable on the outside of the collar-shaped portion. Finally, in another possible form of the invention, a pin can be provided, and which can be moved radially against a spring force, and which acts as a stop means, and wherein, for example, a pivoted lever acts, by a free end, upon a head of the pin and, as a result of the pivoting in the radial direction, moves the same out of engagement with the latching means. The stop means in this arrangement can be located on the safety guard.

Particularly preferably, in the present invention, the stop means as described are provided diametrically opposite the region of the latching means at which the latching means is connected to the safety guard. As a result of this, the region of the latching means that executes the greatest possible displacement, in the case of the latching means which is configured in the form of a spring plate, is delimited axially in its displacement, and consequently unwanted unlatching of the latching means from the counter-latching means is prevented. In particular, the stop means is disposed in the region of a latching lug of the latching means.

Particularly advantageously, it is provided in the present invention that a certain axial distance or predetermined space is provided between the latching means and the stop means. As a result of this distance, a certain deformation of the latching means upon introduction of an energy, for example resulting from a destroyed grinding or parting-off disk, can be reduced by the latching means, through the deformation of the latching means, and therefore need not be absorbed by the safety guard, or by the stop means. The distance or space between the stop means and the latching means in this arrangement is to be selected such that the latching means and the counter-latching means can be prevented from disengaging in the first position, but on the other hand, the stop means can undergo a maximum amount or degree of displacement for the purpose of reducing energy.

In this invention, the changeover from the first to the second position, that is, in the first position in which the stop means acts together with the latching means, to a second position in which it no longer acts together with the latching means, such that the latching means is held in engagement with the counter-latching means, is effected against a restoring force of a restoring means. As a result of this structure, the stop means can only be moved through actuation of the restoring means, and against the force of the same, and, when the movement operation has ended, the stop means returns automatically to the first position as a result of the restoring force of the restoring means. A compression spring or tension spring, or the compression spring or tension spring already described, by means of which the stop means is connected to the screw, can be used as a restoring means in this invention.

For effecting the counter-latching means on the axial end face of the spindle neck, crownwheel-type protuberances, advantageously, are provided, and which preferably have flanks which are sloped in the circumferential direction and disposed radially inwardly.

The aforementioned protuberances are disposed, preferably radially outwardly on the axial end face, such that the region of the end face between them and the drive spindle or tool axis is covered by the spring plate. This makes it possible to achieve effective protection against exposure to dust and particles.

The spindle neck as earlier described is preferably part of a transmission flange part, which can be mounted on the tool housing and which, advantageously, is an injection-molded plastic part that is injection molded around and encloses a spindle bearing. Alternatively, the spindle neck can be formed as a cast metal part.

A yet more extensive sealing of the spindle neck region is realized in that, according to a further form of the invention, the spring plate, when located in a respective latching position, bears against the axial protuberances provided on the end face of the spindle neck.

Further features, details and advantages of the invention are disclosed by the appended claims and the graphic representations and following a description of the preferred embodiments of a safety guard and of a spindle neck part. In the drawings:

Figure 1:
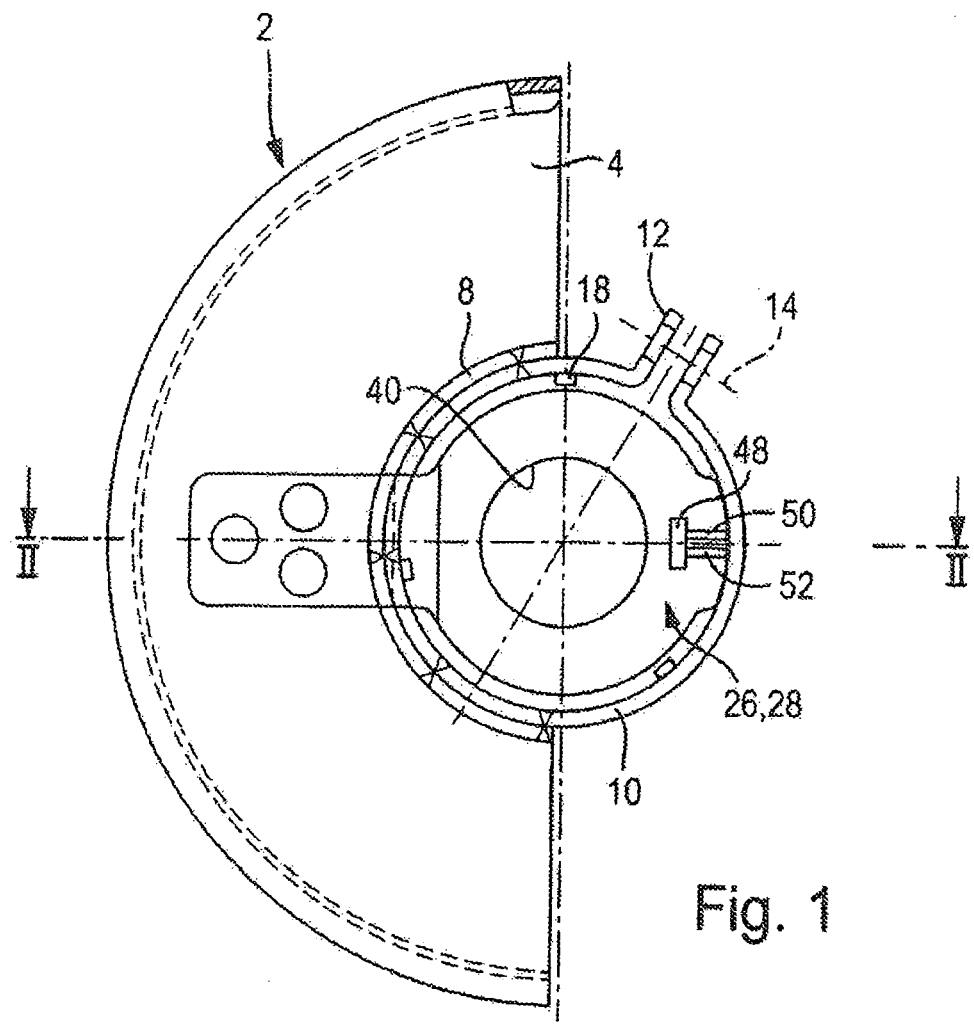
FIG. 1 shows a top view of a safety guard constructed in accordance with the present invention.
Figure 2:
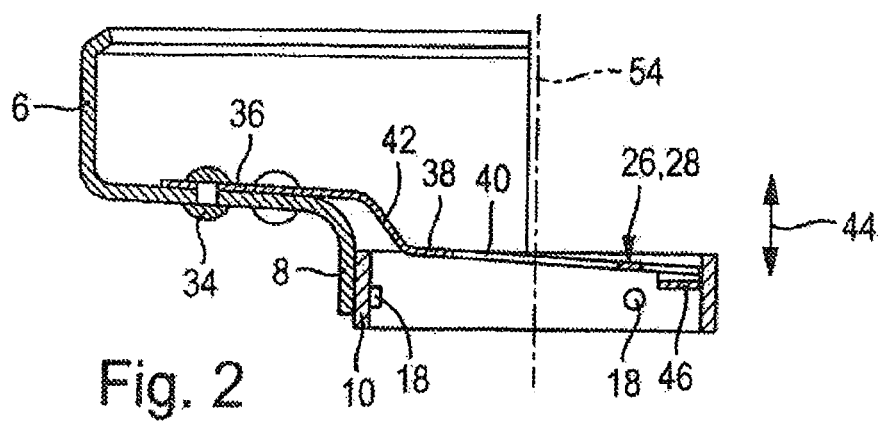
FIG. 2 shows a sectional view, as viewed in the direction of the arrows and taken along line II-II in FIG. 1.

FIGS. 1 and 2 each show a safety guard 2 according to the prior art, without the stop means according to the present invention, and which may be installed on a hand-guided angle grinder or parting-off grinder, not represented.

The safety guard 2 comprises a cover portion 4, in the form of a semicircular disk, having a radially outer edge portion 6 that encompasses or encloses, at least in part, a grinding or parting-off disk, not shown, and which further has a radially inwardly disposed, collar-shaped, flange-type portion 8. The collar-shaped portion is welded radially inwardly to an outer-facing circumferential surface of a likewise collar-shaped, flange-type retaining portion or clamping band 10 which is made of a band material made in the form of a strip which is bent in the shape of a circle. The collar-shaped retaining portion 10 can be expanded, and has two fastening portions 12 which are bent into a shape where they extend radially outwardly, therefrom, and which can be connected to each other by a screw 14, which is merely indicated by the line labeled 14. For the purposes of the present invention, however, the collar shaped retaining portion 10 which is bent in the shape of a circle could also be formed for example, as a single piece, or the fastening tabs 12 could be non-detachably welded to each other, for example with an interposed spacer (not shown), it being necessary for the inner diameter, or the inner circumference, to be formed in accordance with the spindle neck of the electric handheld tool, to be described in the paragraphs which follow.

Provided on the inner circumference of the collar-shaped retaining portion 10 are three radially inwardly projecting guide studs 18. These guide studs are used for the purpose of releasably orienting the safety guard 2 on the spindle neck of an electric handheld tool. In this regard, the safety guard is pushed on the spindle neck with the collar-shaped retaining portion 10, being located in coaxial orientation over the spindle neck, in a manner which is well known per se. The safety guard is oriented such that the guide studs 18 are in alignment with corresponding, groove-shaped guide recesses 20 (FIG. 3), which are formed in the axial direction, and on a transmission flange part 22 which constitutes the spindle neck, and the safety guard 2 can therefore be pushed onto the spindle neck. The safety guard 2 is thus pushed on in the axial direction and then turned into a rear grip position. In this regard, the guide studs 18 are turned or moved into a, groove-shaped, guide receiver 24 (FIG. 4) and which extends in the circumferential direction on the transmission flange part 22.

In order that the safety guard 2 can be arrested or secured in a self-locking manner, and in various rotary oriented positions, the safety guard 2 comprises a latching means 26, which takes on the form of a spring plate 28 that extends in a planar manner, and which further can be resiliently displaced and that, when in a respective latching position, acts together with counter-latching means 30 which is located on the axial end face 32 of the transmission flange part 22 so as to inhibit rotation of the safety guard 2.

The spring plate 28 comprises a portion 36 that bears against the inside surface of the safety guard 2 and which further is connected to the same by means of rivets 34. The spring plate further comprises a disk-shaped portion 38, which has an opening 40, which is formed herein and through which there passes a drive spindle or tool axis, not represented. The portion 36 and the disk-shaped portion 38 are connected to each other via a connecting portion 42 which is formed or bent at an angle (FIG. 2).

The disk-shaped portion 38 can be resiliently displaced in the axial direction, i.e. in the direction of the double arrow 44 (FIG. 2). The disk-shaped portion comprises, on the side facing towards the end face 32 of the transmission flange part 22, a latching lug 46, which is pressed out of the plane of the spring plate, or of the disk-shaped portion 38, and which is delimited radially inwardly by a punched freeform 48 (FIG. 1). The latching lug 46 has flanks or surfaces 50, and 52 constituting run-on slopes which extend in the circumferential direction.

Figure 3:
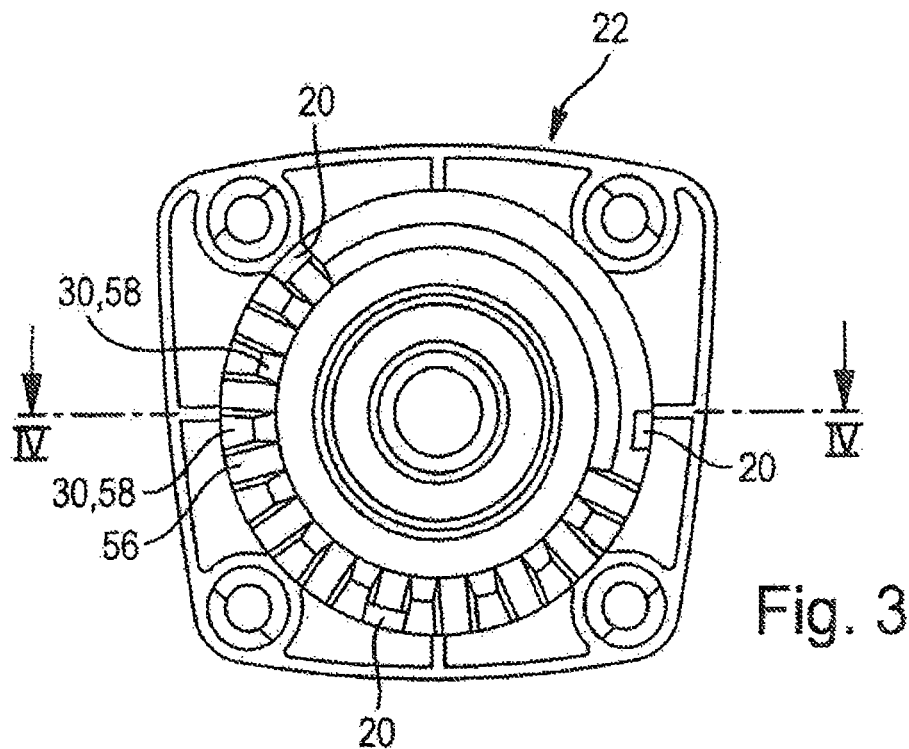
FIG. 3 shows a plan view of a spindle neck part.

As the safety guard 2 is being pushed onto the spindle neck, or onto the transmission flange part 22, and in the manner described above, the resilient latching means 26 is displaced slightly upwardly by the counter-latching means 30, such that the disk-shaped portion 38 is aligned substantially perpendicularly and in substantially coaxial orientation relative to the spindle axis 54. The latching lug 46 of the spring plate 28 in this event, then cooperatively acts together with the counter-latching means 30 so as to inhibit rotation of the safety guard, in that it seeks and is received in a position in a hollow or space 56 which is defined between two protuberances 58 (FIG. 3). The disk-shaped portion 38, when located in a given latching position, then bears against the axial end face 60 of the protuberances 58, and thus causes the spindle-bearing region 62 to be sealed in an effective manner against the machining side. This, of course, prevents dust and debris from being deposited thereunder the safety guard 2.

Figure 4:
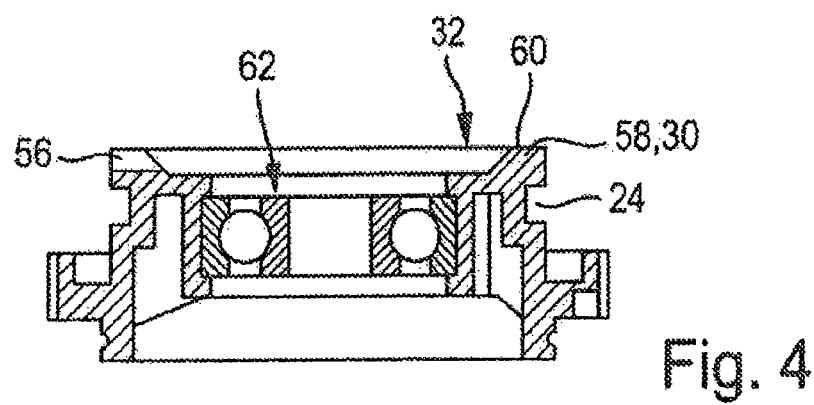
FIG. 4 shows a sectional view, as viewed in the direction of the arrows and taken along line IV-IV in FIG. 3.

The following figures now show alternative forms of the invention, and wherein the disclosed safety guard 2 operates so as to be identical to the safety guard according to FIGS. 1 and 2, apart from the alternative stop means which are described in the following paragraphs, and to that extent reference is made to the description above. It should be understood that the spindle neck, as shown in FIGS. 3 and 4, has not undergone any change, such that, reference may be made to the description provided in the earlier paragraphs above. Moreover, the same reference numerals are used for the parts that are the same.

The following FIGS. 5 to 13 do not show the cover portion 4, (FIG. 1) in the form of a semicircular disk, having the radially outer edge portion 6 that encompasses or surrounds, at least in part, a grinding or parting-off disk, nor do they show the collar-shaped, flange-type portion 8. These figures show only the collar-shaped, retaining portion 10, which is also referred to as a clamping band, and which is connected to the latter, and which is made of a band material in the form of a strip which is bent or formed in the shape of a circle. The remaining portion 10 as earlier described can be expanded, as seen in FIGS. 1 and 2, and has two fastening portions 12, which are bent or otherwise oriented in a radially outward direction, and which can be connected to each other by a screw which is merely indicated by the line labeled 14, and which can be moved towards each other and away from each other by the movement of the screw, (Not shown).

Likewise not represented in these figures are the earlier described guide studs which facilitate the orientation of the safety guard in a particular, predefined position, and which then work together with a groove-shaped guide recess which is formed in the spindle neck, and which extends in the circumferential direction and which can be turned into a rear grip position. In this respect, however, the following designs are realized in a manner similar to those of FIGS. 1 and 2.

Likewise identically realized is the latching means 26, which takes on the form of a spring plate 28, having a planar form and that, when properly disposed in a respective latching or rotary position, acts together with counter-latching means 30 on the axial end face 32 of the transmission flange part 22 so as to inhibit rotation of the safety guard 2.

Figure 5:
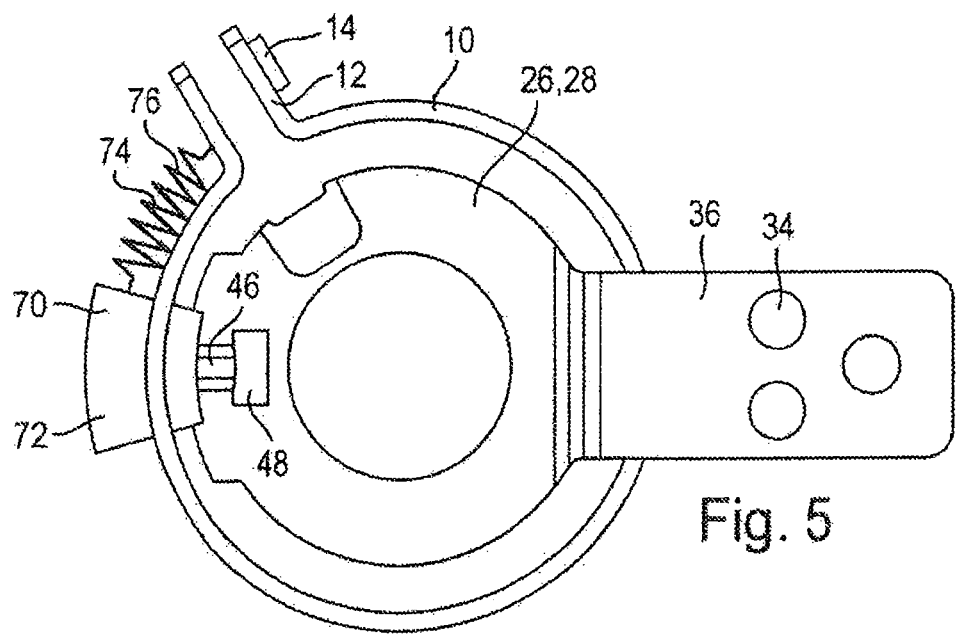
FIG. 5 shows a top view of safety guard realized according to a first form of the invention, and wherein the stop means is located in a first position.
Figure 6:
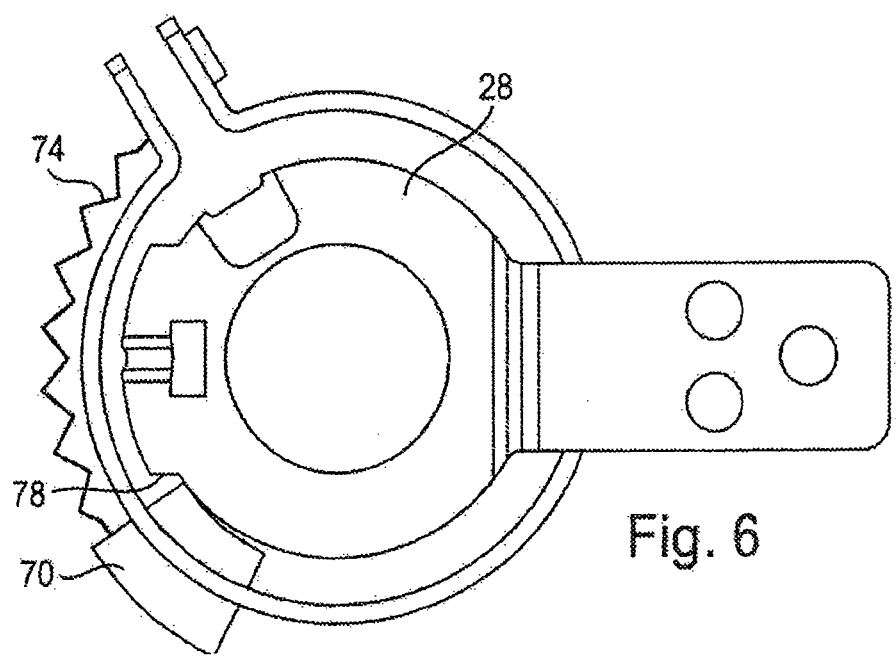
FIG. 6 shows a top plan view of the safety guard according to FIG. 5, and wherein the stop means is located in a second position.

In an alternative form of the invention, FIG. 5 now shows, in addition, a stop means 70, which is located opposite to the portion 36 of the spring plate 28, and by which the spring plate 28 bears against the inside of the safety guard (not shown) and which is further connected to the same by means of rivets 34. The stop means in the present embodiment can be a portion 72, which is shaped in the form of a segment of a ring, and which, by means of a spring 74 (here, a tension spring), is held in a first position, and in which position the stop means 70 acts together with the spring plate 28. The spring 74 is connected to the safety guard 2 (not shown). Against the biasing force of the spring 74, which serves as a restoring means 76, the stop means 70 can be moved out of engagement with the spring plate 28 by displacement of the stop means 70 from a first position (FIG. 5) to a second position, which is shown in FIG. 6, such that a displacement of the spring plate 28 can be achieved in a direction which is perpendicular to the plane of the drawing, and with the result that the spring plate 28 can be pivoted in the axial direction. The axial displacement of the spring plate 28, permits the latching lug 46 to disengage from the associated counter-latching elements of the counter-latching means 30. With this movement the latching lug 46 can index or move over the counter-latching means 30 and thus the safety guard is rendered adjustable from one rotary position to another by turning the safety guard. If an operator then releases or disengages the stop means 70, from the second position as seen in FIG. 6, the tension spring 74 immediately takes or moves the stop means 70 back into the first position, shown in FIG. 5. The displacement or movement of the stop means 70 in this case is effected in the circumferential direction. The stop means 70 movement is guided in the radial and in the axial direction by the collar-shaped portion 10 and is further delimited against displacement in these directions.

Moreover, this arrangement also makes it visually evident to an operator whether the latching lug 46 has latched into or properly engaged the counter-latching means 30. In a situation in which the latching lug 46 does not properly engage the counter-latching means 30, it is not possible for the stop means 70 to be restored or located back to the first position, shown in FIG. 5, since the stop means 70 comes to bear or resets against a shoulder 78 of the spring plate 28 and is blocked thereby while the spring plate 28 is displaced in the axial direction.

The tension spring 74 can be, in the form of, a spiral spring, which can be connected in an articulated manner with one end attached to the fastening portions 12 and the opposite end is connected in an articulated manner to the stop means 70.

Figure 8:
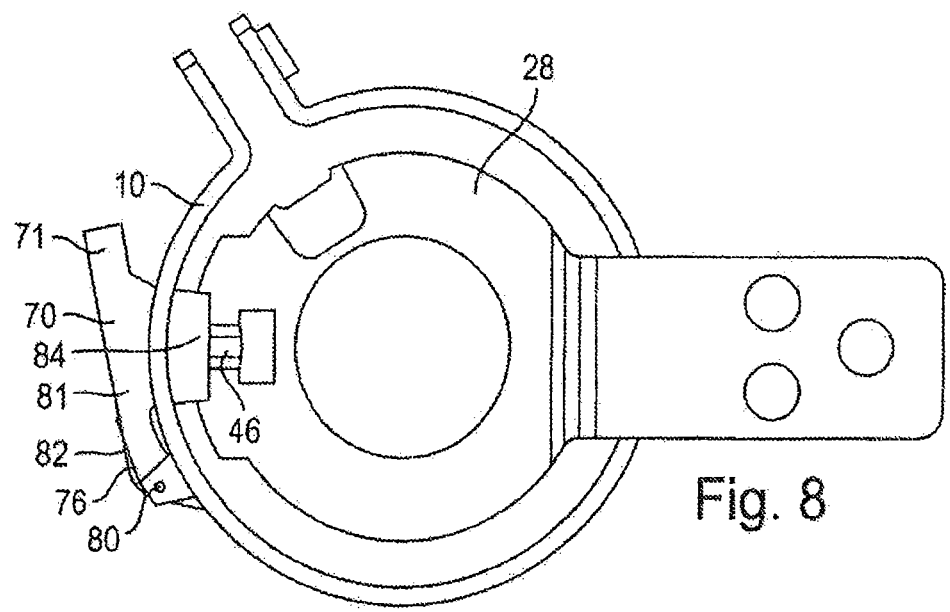
FIG. 8 shows a top plan view of a safety guard realized according to another form of the invention, and wherein the stop means is shown in a first position.
Figure 10:
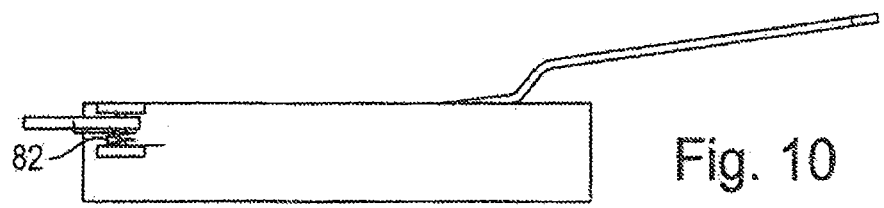
FIG. 10 shows a side elevation view of the structure as illustrated in FIG. 8.
Figure 9:
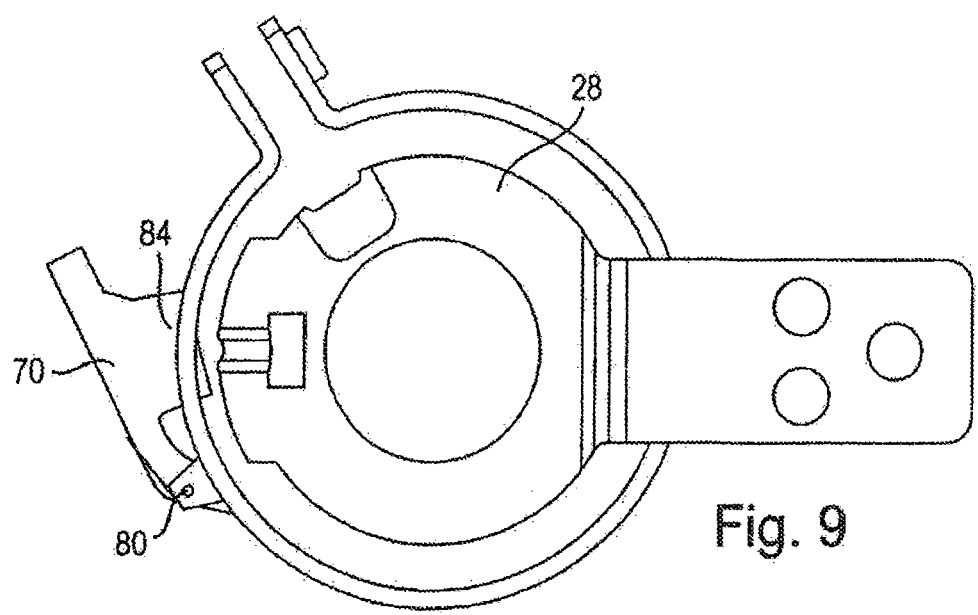
FIG. 9 shows a top plan view of the safety guard according to FIG. 8, and wherein the stop means is shown in a second position.

FIGS. 8 to 10 show a further embodiment of the present invention.

These three figures show an alternative embodiment with respect to the stop means 70, and wherein the stop means 70 is depicted here as a lever 81. The lever 81 is pivotable about a pivot axis 80 which runs parallel to the spindle axis 54. Further, the lever 81 of the stop means 70 is connected in an articulated manner to the outer circumferential surface of the clamping band 10 (not shown). Moreover, a spring element 82 (FIG. 10) acts together with the lever 81, and serves as a restoring means 76 which acts upon the lever 81 of the stop means 70 when it is located in the first position, as seen in FIG. 8. The lever 81 in this embodiment has a portion 84 which, when located in a first position (FIG. 8), it at least partially overlaps the spring plate 28 and thus prevents an axial displacement of the spring plate 28 in the axial direction. In the first position the latching lug 46 is prevented from disengaging from the counter-latching means 30. Upon being pivoted about the pivot axis 80 into the second position, as seen in FIG. 9, the portion 84 of the pivoted lever 81 and which forms the stop means 70 disengages from the spring plate 28, i.e. there is no longer any overlap of the spring plate 28, such that the spring plate 28 can move freely in the axial direction, and the latching means 26 can therefore be disengaged from the counter-latching means 30. In the second position as seen in FIG. 9, the safety guard 2 can therefore be turned, about the spindle axis 54, from a first rotary position to a second rotary position. The spring element 82, which serves as a restoring means 76, is in this embodiment seen in FIG. 10.

Figure 11:
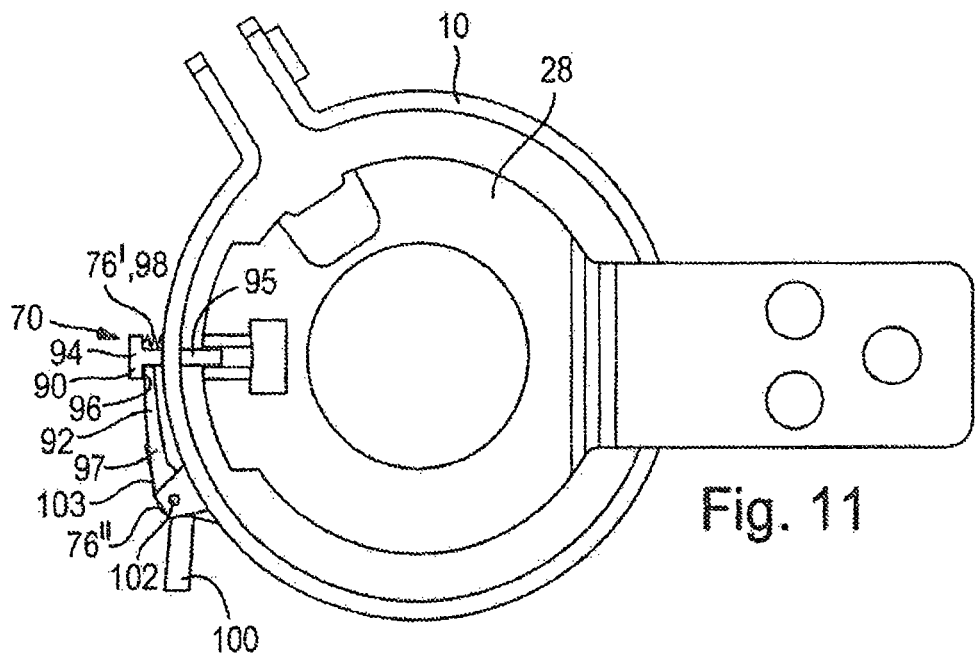
FIG. 11 shows a top plan view of a safety guard realized according to a still further form of the invention, and wherein the stop means is shown in a first position.
Figure 13:
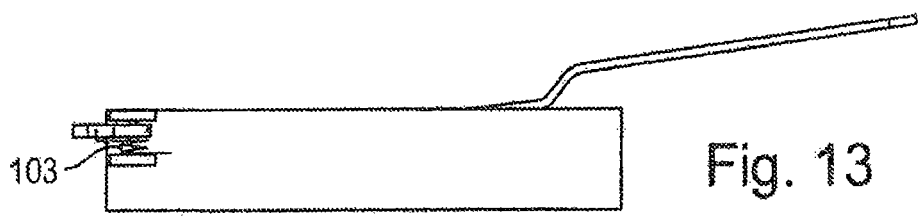
FIG. 13 shows a side elevation view of the structure as illustrated in FIG. 11.
Figure 12:
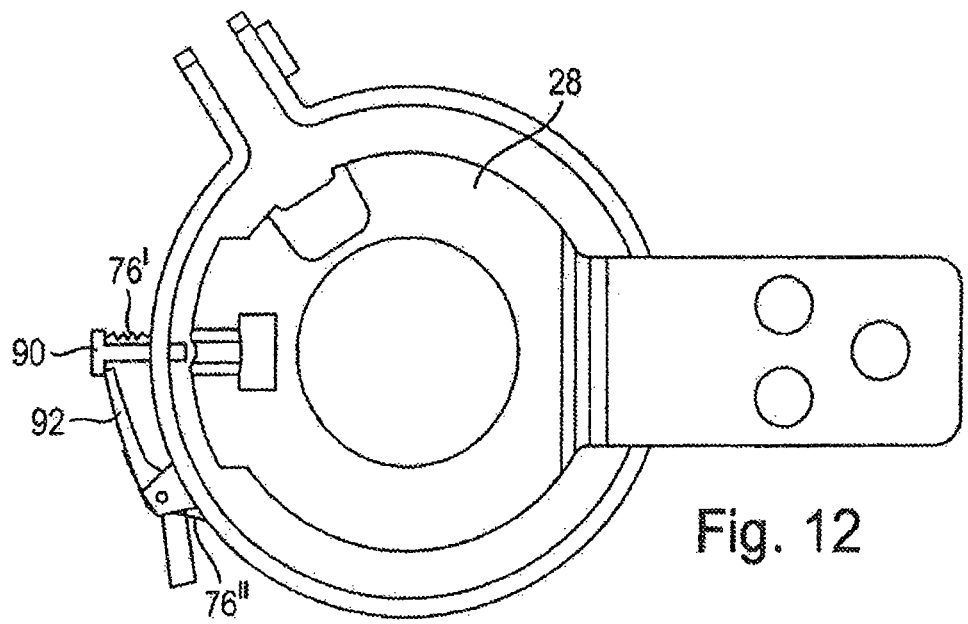
FIG. 12 shows a top plan view of the safety guard according to FIG. 11, and wherein the stop means is shown in a second position.

The third embodiment of the invention is seen in FIGS. 11 to 13, and wherein, again, parts that are the same are denoted by the same reference numerals and only a differing configuration of the stop means 70 is described. A further embodiment of a stop means 70 is shown, and which includes two elements, namely a pin 90, which serves as a stop means, and a pivoted lever 92. The pin in this embodiment has a cylindrical shank 95 and has a head 94 that is connected to the shank 95. The head 94 has a greater diameter than the shank 95, such that a shoulder 96 is created in the region of the transition from the shank 95 to the head 94. A lever arm 97 which forms a portion of the pivoted lever 92, at a position without a load, as in FIG. 11, lies with its free end positioned against this shoulder 96. In this embodiment, by means of a tension spring 98, which constitutes a first restoring means 76', the pin 90 is drawn inwardly in a radial direction and towards the clamping band 10, and thus overlaps the spring plate 28 over at least a portion of the length of its shank 95.

The pivoted lever 92 is likewise resiliently mounted by means of a further restoring means 76", which is effected in a manner similar to the spring element 82 as seen in FIGS. 8 to 10, and denoted by the numeral 103 (FIG. 12).

The pivoted lever 92 in this embodiment is very similar in form to the pivoted lever 81 as seen in FIG. 8, with only the grip portion 100, for moving and pivoting the pivoted lever about the pivot axis 102, being provided on the opposite side of the lever arm 92 and, for example denoted by 71 in FIG. 8, representing an extension of the lever arm.

If the pivoted lever 92 is now displaced or rotated about the pivot axis 102 by actuation on the grip portion 100, a region of the lever arm 92 that bears against the head 94 of the pin 90 acts upon the latter and displaces the pin 90 against the biasing force of the springs 98 and 103. In the displaced position, the pin 90 no longer has an overlap with the spring plate 28, and this is shown in FIG. 12. If the pivoted lever 92 is no longer actuated, the pin is brought back into the position shown in FIG. 11, owing to the restoring means 76' and 76" (FIG. 12).

Figure 7:
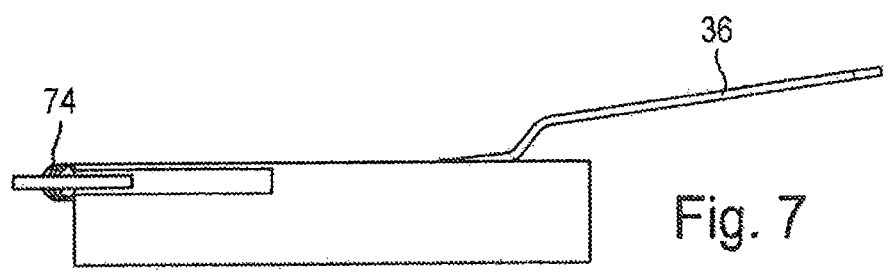
FIG. 7 shows a side elevation view of the structure illustrated in FIG. 5.
Figure 14:
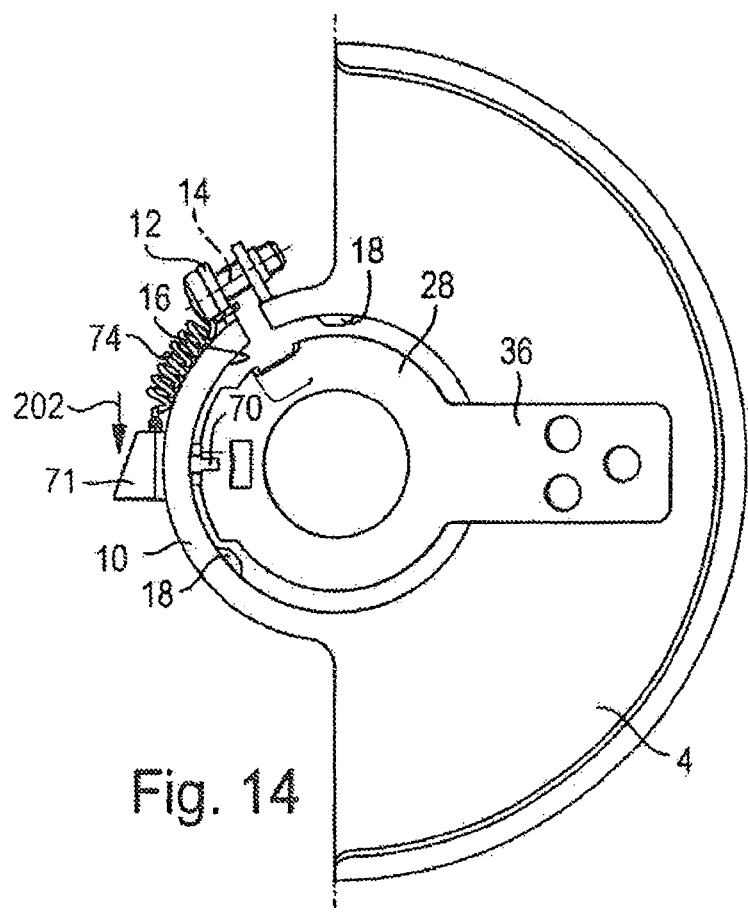
FIGS. 14 to 16 show a further exemplary form of the invention, in a top plan; transverse, vertical sectional and side elevation views.
Figure 15:
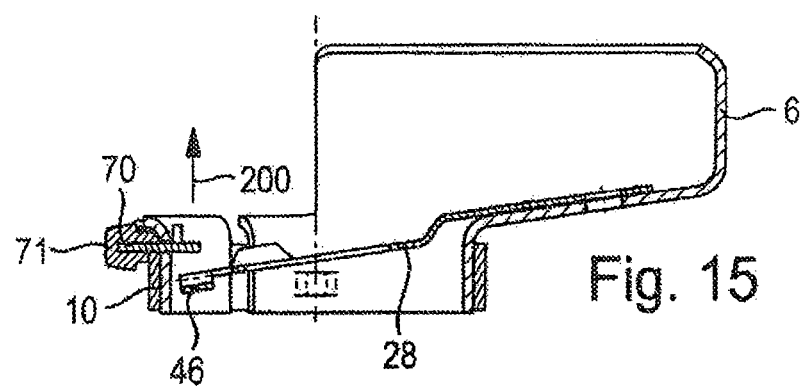
Figure 16:
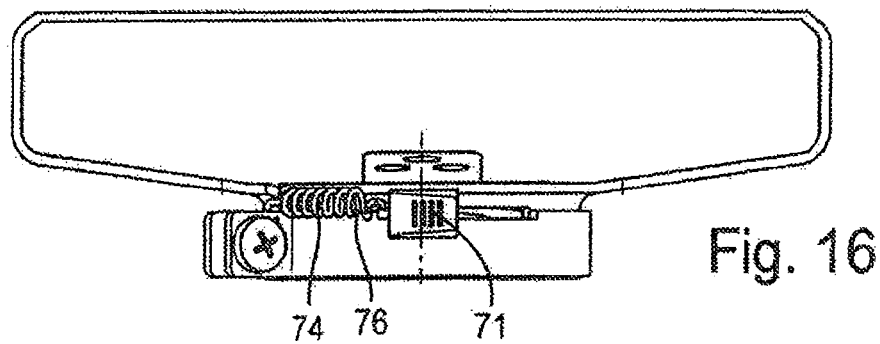

FIGS. 14 to 16 show an embodiment similar to that of FIGS. 5 to 7. Unlike the preceding figures, however, these views show the cover portion 4, which is illustrated in the form of a semicircular disk, and the edge portion 6 that surrounds, at least in part, a grinding or parting-off disk. Likewise represented, unlike the preceding figures, are the guide studs 18, which are provided on the inner circumference 16 of the collar-shaped retaining portion. The safety guard according to FIGS. 14 to 19 is fixed in a given position, in this embodiment as explained earlier with regards to FIGS. 1 to 4.

Otherwise, the exemplary embodiment as shown in FIGS. 14 to 16 is a variation of a safety guard as represented in FIGS. 5 to 7. Also provided in FIGS. 14 to 16 is a stop means 70, which is located opposite the portion 36 of the spring plate 28 of the safety guard and which is fixed to the safety guard 2. The stop means 70 in this embodiment includes a stud which projects through the collar-shaped retaining portion 10, as can be seen, in particular, in FIG. 15. On the outer circumferential surface of the collar-shaped retaining portion 16, the stop means 70 is connected to a grip portion 71, and the grip portion is supported against the retaining portion 10 and thus prevents the stop means 70 from tilting.

In the drawings as provided, herewith, the stop means 70 prevents the spring plate 28 from being displaced in the direction of the arrow which is labeled 200.

FIG. 16 now shows a side elevation view, in which the spring 74, which at the same time serves as a restoring means 76, can be seen. The grip portion 71 in this embodiment is formed such that it can be easily gripped by the hand of an operator, and slippage of a finger on the grip portion 71 is thus prevented. As in the case of FIG. 6, a displacement of the stop means is effected by a movement along the arc as defined by the retaining portion 10. In this embodiment, the grip portion 71 has formed thereon a slope against which a force 202 can be applied in order to subject the spring 74 to tensile loading and displace the stop means 70 as appropriate. Releasing of the grip portion 71 then causes the spring to be brought back into its the position as seen in FIG. 14.

Figure 17:
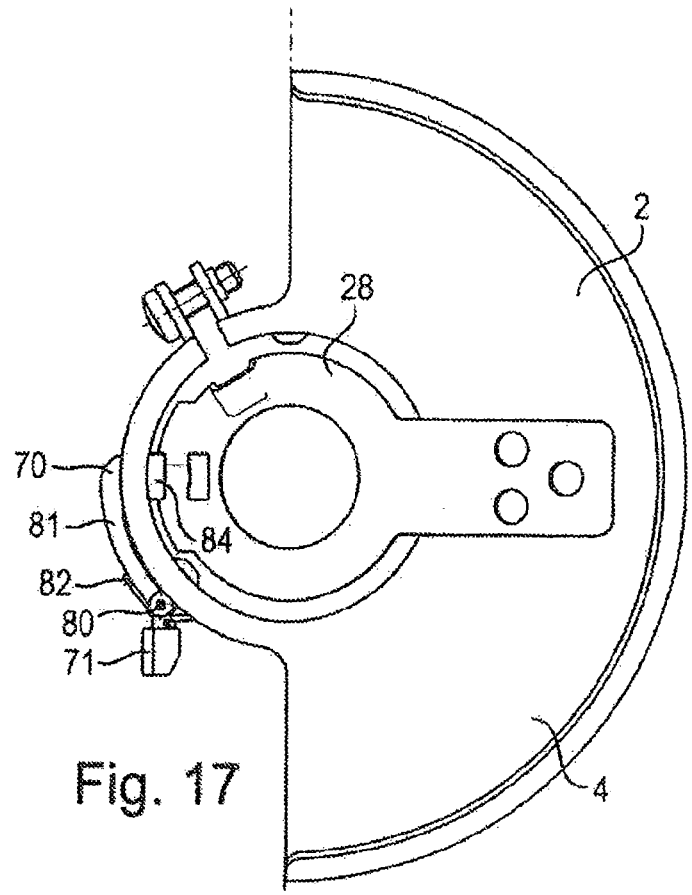
FIGS. 17 to 19 show a further exemplary form of the invention, in a top plan; transverse, vertical sectional and side elevation views.
Figure 18:
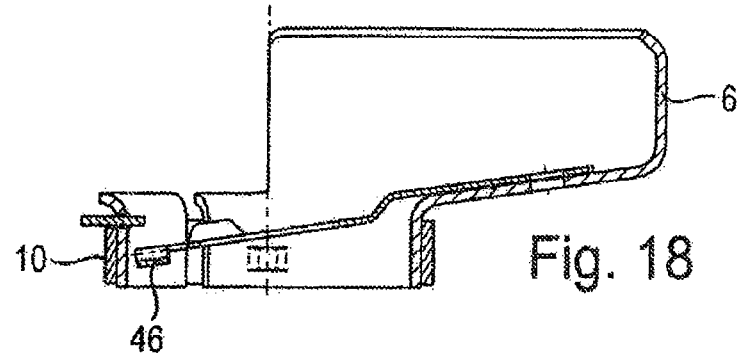
Figure 19:
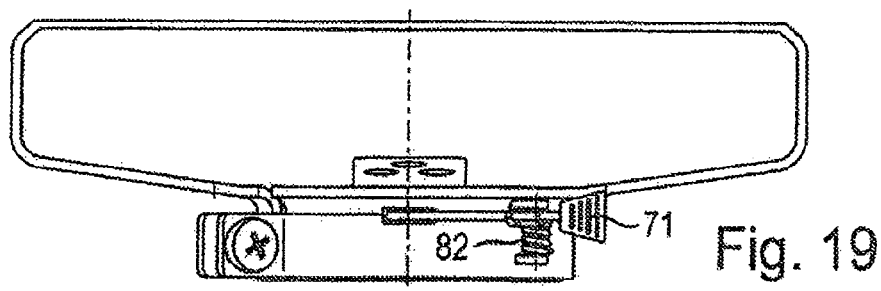

FIGS. 17 to 19 shows an embodiment similar to the design shown in FIGS. 8 to 10. In this embodiment, the safety guard 2 is again illustrated with its cover portion 4 and the accompanying edge portion 6. Otherwise, the safety guard is similar in its structure and function to that shown in the preceding FIGS. 14 to 16. As in the case of the design according to FIGS. 8 to 10, here a lever 81 is provided as a stop means 70, and which can be pivoted or rotated radially outwardly about an axis of rotation 80 such that the portion 84 of the lever no longer overlaps the spring plate 28. The grip portion, however, which, here likewise, is again denoted by the reference 71, is located opposite the portion 84. The lever 81 in this case is held in its position as shown in FIG. 17 by means of a spring element 82 (FIG. 19).

FIG. 18 now shows a transverse, vertical sectional representation corresponding to FIG. 17, and FIG. 19 and which shows a side elevation view of the same. Here again, when the stop means 70 is in the position as shown in FIG. 17, the overlap of the portion 84 with the spring plate 28 prevents a displacement of the spring plate 28, such that the latching lug 46 can no longer be unlatched from the counter-latching means 30. Unlatching of the latching means 26 from the counter-latching means 30 is made possible only insofar as the lever 81 is displaced by pressure which is applied upon the grip portion 71 and which causes the lever to disengage from the spring plate 28.

The earlier described forms of the safety guard can be produced, advantageously, in a simple and cost-effective manner, and further protects the latching means and counter-latching means 26, 30, and the spindle-bearing region 62, from exposure to dust and particles. Owing to the axial bias exerted in the direction of the spindle axis 54 by the resiliently displaceable latching means 26. The present invention results in the safety cover being disposed without play or substantial movement on the spindle neck of the handheld tool.

The safety guard of the present invention can furthermore be adjusted and mounted or readily detached in a user-friendly manner, without any need to use a tool, for instance a screwdriver, hex key or the like, for this purpose.

Further, the safety guard as described fulfills the requirements of the recently introduced DIN EN 60745-2-3 and further operates upon the destruction of a grinding or parting-off disk, to prevent the safety guard 2 from turning or rotating beyond the permissible amount out of a given rotary position.

The elasticity of the spring plate 28 and of the stop means 70 enables the energy to be reduced in the case of loading. In addition, it is possible to control the turning (e.g. by deliberately moving past latches). Energy can also be reduced by this means, which may be necessary in order to prevent damage to the transmission flange part.

The invention claimed is:

1. An electric handheld tool comprising:
a safety guard that can be releasably fastened to a spindle neck of the electric handheld tool, and that can be rotated, at least to a limited extent, about an axis which is parallel to the spindle axis or in alignment with the spindle axis;
a resiliently biased latching means rotary mounted on the safety guard;
a counter-latching means mounted on the spindle neck, and wherein the latching means when located in various rotary positions acts together with the counter-latching means on the spindle neck so as to inhibit rotation, and wherein the latching means, when in a rotary position, is in engagement with the counter-latching means, and wherein the safety guard can be pushed onto the spindle neck and then brought into a rear grip position, in which the latching means can be resiliently displaced on the safety guard in the axial direction of the spindle axis, and wherein the counter-latching means is located on an axial end face of the spindle neck; and a stop means is provided, which, in a first position, acts together with the latching means and limits the axial resilient displacement of the latching means in such a way that the latching means and counter-latching means are held in engagement and, when located in a second position, releases the axial displacement to such an extent that the latching means and counter-latching means are out of engagement and can be turned, one relative to the other, and wherein the resiliently displaceable latching means extends substantially perpendicularly in relation to the spindle axis, and wherein the resiliently displaceable latching means comprises a planar spring plate, and wherein the resiliently displaceable latching means has an opening through which the drive spindle or tool axis extends.

2. An electric handheld tool as claimed in claim 1, and wherein the safety guard has a collar-shaped portion by which the safety guard can be pushed onto the spindle neck, and wherein the resiliently displaceable latching means is disposed with a portion that is inside the collar-shaped portion and which further surrounds the drive spindle or tool axis.

3. An electric handheld tool as claimed claim 2, and wherein the resiliently displaceable latching means is formed onto an inside surface of the safety guard which faces towards the tool or workpiece.

4. An electric handheld tool as claimed in claim 3, and wherein the resiliently displaceable latching means has a first portion that bears against the inside surface of the safety guard and that is further connected to the safety guard and located between the first portion and a second portion surrounding the drive spindle or tool axis, and further has a connecting portion bent at a given angle.

5. An electric handheld tool as claimed in claim 4, and wherein the planar spring plate has at least one latching lug which extends outwardly from the plane of the spring plate and in the direction of the axial end face of the spindle neck.

6. An electric handheld tool as claimed in claim 5, and wherein the latching lug has flanks defining run-on slopes which are oriented in the circumferential direction and in the direction of rotation of the safety guard.

7. An electric handheld tool as claimed in claim 6, and wherein the latching lug has a rounded configuration.

8. An electric handheld tool as claimed in claim 6 and wherein the latching lug is delimited by a punched freeform.

9. An electric handheld tool as claimed in claim 6, and wherein the stop means can move in either the radial or circumferential direction, and from either the first to the second positions.

10. An electric handheld tool as claimed in claim 9, and wherein the stop means, when located in the first position, maintains a predetermined distance from the latching means, and wherein the distance from the latching means is greater than zero but less than a distance at which the latching means and the counter-latching means disengage.

11. An electric handheld tool as claimed in claim 10, and wherein the stop means can be moved from the first position and to the second position by overcoming a restoring force which is exerted by a restoring means.

12. An electric handheld tool as claimed in claim 11, and wherein the restoring means is a tension or compression spring.

13. An electric handheld tool as claimed in claim 12, and wherein the stop means is fixed to a pivoted lever that is rendered pivotable about an axis of rotation which is substantially parallel to the spindle axis, and which further can be moved by this pivoted lever between a first to a second position.

14. An electric handheld tool as claimed in claim 13, and wherein the stop means is fixed at an orientation in the axial direction by the collar-shaped portion.

15. An electric handheld tool as claimed in claim 14, and wherein the counter-latching means is located on the axial end face of the spindle neck, by a plurality of protuberances which are disposed in a crownwheel pattern.

16. An electric handheld tool as claimed in claim 15, and wherein the protuberances have flanks which are sloped in the circumferential direction.

17. An electric handheld tool as claimed in claim 15, and wherein the protuberances have flanks sloped in the radial direction.

18. An electric handheld tool as claimed in claim 15, and wherein the protuberances are disposed radially outwardly, and on the axial end face, and a portion between the protuberances and the drive spindle or tool axis is covered by the spring plate.

19. An electric handheld tool as claimed in claim 18, and wherein the spring plate, when located in a latching position, bears against the axial protuberances defined by the spindle neck.

20. An electric handheld tool as claimed in claim 19, and wherein the spindle neck is part of a transmission flange part which is mounted on the tool housing.

* * * * *